United States Defensive Publication [19] (H) [11] T981,003

Bartron et al. [43] Apr. 3, 1979

[54] FILLED, BIAXIALLY ORIENTED, THERMOPLASTIC FILM HAVING PREFERENTIAL SHRINKAGE AND METHOD OF MAKING SUCH FILM

[75] Inventors: Lester R. Bartron; Samuel P. Anderson; Rudolph H. Michel, all of Wilmington, Del.

[73] Assignee: E. I. Du Pont de Nemours and Company, Wilmington, Del.

[21] Appl. No.: 923,569

Related U.S. Application Data

[63] Continuation of Ser. No. 882,983, Mar. 3, 1978, abandoned, which is a continuation of Ser. No. 743,675, Nov. 22, 1976, abandoned which is a continuation-in-part of Ser. No. 633,542, Nov. 19, 1975.

[22] Filed: Jul. 11, 1978

[51] Int. Cl.[2] ..... C08J 9/00

[52] U.S. Cl. ..... 264/210 R; 264/289; 260/42.45; 260/42.46; 260/897 A; 521/79; 521/134; 521/143; 521/144

[57] ABSTRACT

A filled, biaxially oriented, void-containing thermoplastic film suitable for making heat-shrinkable bands is provided having shrinkage on heating to 100° C. of greater than 5%, which shrinkage in turn is at least 5% greater than the shrinkage in a direction perpendicular thereto.

A process for preparing this film with its preferential shrinkage is provided including the steps of:

(a) melt-blending a $C_2$-$C_{10}$ $\alpha$-monoolefin polymer and at least 20 weight percent inert filler, based on the total weight of polymer and filler;

(b) forming a film from the melt blend;

(c) cooling the film to a temperature below the melting point;

(d) biaxially stretching the film at least about twice its original forming dimensions in mutually perpendicular directions while the film temperature is above the line-drawing temperature and below the polymer melting temperature, until the film has at least about 30% voids;

(e) cooling the film to room temperature; and (f) post-stretching the biaxially stretched film in a selected direction at a temperature below 100° C. to an extent that provides the above-mentioned preferential shrinkage in the filled film.

6 Claims, No Sheets Drawing,

30 Pages Specification

The file of this unexamined application may be inspected and copies thereof may be purchased (849 O.G. 1221, Apr. 9, 1968).